June 28, 1960

R. W. RUE 2,942,583

PRESSURE GRADUATING CONTROL VALVE

Filed March 3, 1958

INVENTOR
Robert W. Rue

BY Dodge and Sons
ATTORNEYS

United States Patent Office 2,942,583
Patented June 28, 1960

2,942,583

PRESSURE GRADUATING CONTROL VALVE

Robert W. Rue, Kalamazoo, Mich., assignor to The New York Air Brake Company, a corporation of New Jersey Filed Mar. 3, 1958, Ser. No. 718,545

5 Claims. (Cl. 121—46.5)

This invention relates to fluid pressure control valves.

The object of the invention is to provide a control valve having an inlet chamber, an exhaust chamber, a controlled pressure chamber, and a movable valve element controlling communication between the controlled pressure chamber and each of the other two chambers, and wherein the pressure in the controlled pressure chamber is proportional to the position of the movable valve element and can be varied gradually in response to movements of said element. In accordance with the invention, the controlled pressure chamber is separated from the inlet and exhaust chambers by seat lands. The movable valve element carries a valve land and is shiftable between one limiting position in which the valve land and one seat land interrupt flow between the inlet chamber and the controlled pressure chamber, and another limiting position in which the valve land and the other seat land interrupt flow between the controlled pressure chamber and the exhaust chamber. In an intermediate position of the movable valve element, portions of the two seat lands and the valve land cooperate to define a restricted passage between the controlled pressure chamber and the inlet chamber and another such passage between the controlled pressure chamber and the exhaust chamber. The restriction to flow and consequently the pressure drop along each passage is proportional to its length, and the lengths are varied in relatively reverse senses as the movable valve element is shifted in opposite directions from said intermediate position. In this way, the pressure established in the controlled pressure chamber depends on the position of the movable valve element and is varied gradually in response to movements of said element.

The preferred embodiment of the invention will be described in relation to the accompanying drawing, in which.

Figure 1:
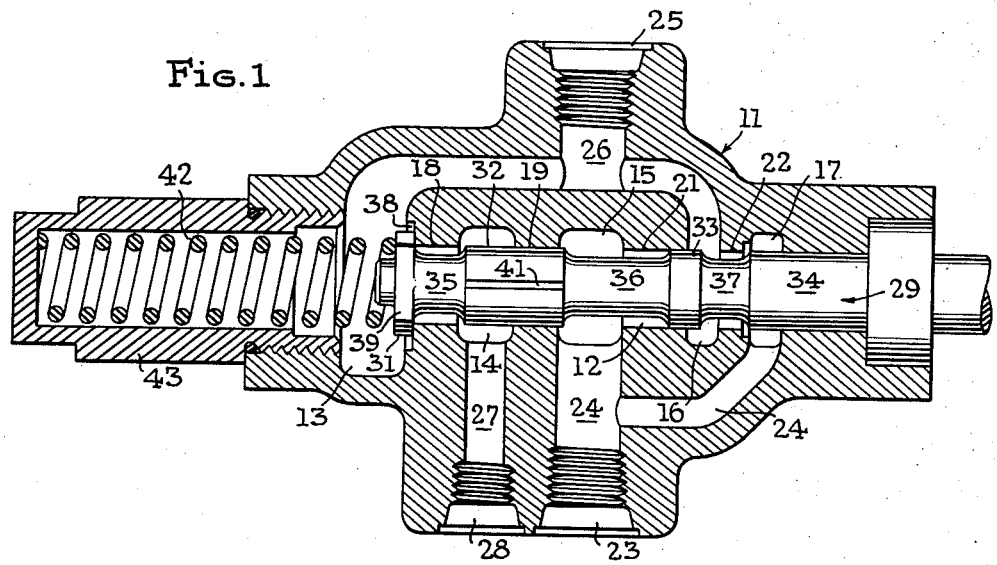
Fig. 1 is a sectional view of a plunger valve incorporating the invention; the plunger being shown in one of its limiting positions.

Referring to Fig. 1, the valve comprises a housing 11 containing a through bore 12 along which are spaced five annular chambers 13 through 17. Cylindrical seat lands 18, 19, 21 and 22 separate these chambers, as shown. Annular chambers 15 and 17 communicate with an inlet port 23 via branched passage 24, and annular chambers 13 and 16 communicate with an exhaust port 25 via branched passage 26. Passage 27 connects annular chamber 14 with a motor port 28.

Mounted in the bore 12 is a reciprocable valve plunger 29 having four spaced valve lands 31, 32, 33 and 34 separated by annular grooves 35, 36 and 37. The land 31 seats in counterbore 38 and is formed with two diametrically opposed flats 39 which are spaced apart by a distance equal to the diameter of groove 35. In this way, the groove 35 is in continuous communication with the annular chamber 13. The valve land 32 is formed with a longitudinal groove 41 of constant cross-sectional area which extends between annular grooves 35 and 36. A coil spring 42, reacting between cap 43 and plunger land 31, urges the plunger to the position shown in Fig. 1.

In operation, inlet and exhaust ports 23 and 25 are connected with a pump and sump, respectively. The pressure line from the pump to inlet port 23 should include a relief valve since, as will appear below, when the plunger 29 is shifted from its Fig. 1 position, the unloading path afforded by the valve 11 will be interrupted. In a typical installation, the control pressure port 28 would be connected with a single-acting spring-biased expansible chamber fluid motor such as would be used to control brakes and clutches. With the valve in the position shown in Fig. 1, pressure fluid entering inlet port 23 flows to the sump along an unloading path comprising branched passage 24, annular chamber 17, plunger groove 37, annular chamber 16, branched passage 26, and exhaust port 25. A small portion of the inlet flow is transmitted to the exhaust port 25 via longitudinal groove 41, plunger groove 35, flats 39, annular chamber 13, and branched passage 26. Since the controlled pressure port and its associated chamber 14 are in free communication with the sump, the controlled motor is vented.

In order to pressurize the controlled motor, valve plunger 29 is shifted to the left from its Fig. 1 position. This movement causes plunger lands 34 and 32 to overtravel seat lands 22 and 18, thus interrupting the unloading path from inlet port 23 to exhaust port 25 through annular chamber 17 as well as the unrestricted path between annular chamber 14 and the sump through plunger groove 35. All of the high pressure fluid entering inlet port 23 now flows through branched passage 24, annular chamber 15, and longitudinal groove 41 to annular chamber 14, and from there to the sump through longitudinal groove 41, plunger groove 35, flats 39, annular chamber 13, and exhaust port 25. The longitudinal groove 41 and the seat lands 18 and 19 cooperate to define restricted passages leading to and from annular chamber 14; the restriction to flow afforded by, and consequently the pressure drop along, each of these passages, being a function of its length. As the valve plunger 29 moves to the left, the length of the restricted passage between annular chambers 14 and 15 decreases and the length of the restricted passage between annular chambers 13 and 14 increases. Therefore, the pressure drop between chambers 14 and 15 and between chambers 13 and 14 decreases and increases, respectively. These changes produce a gradual increase in the pressure in annular chamber 14 as plunger 29 moves to the left.

Figure 2:
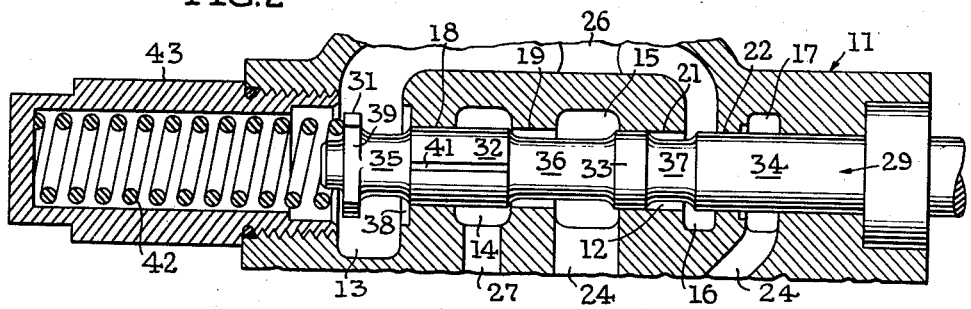
Fig. 2 is a view similar to Fig. 1 showing the valve plunger in an intermediate position.
Figure 3:
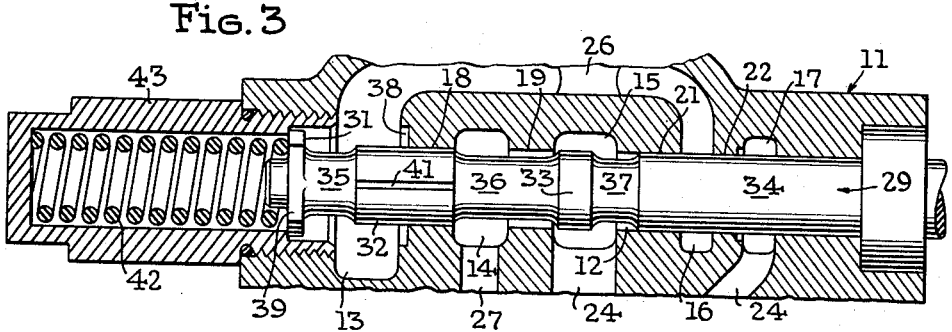
Fig. 3 is a view similar to Fig. 1 showing the valve plunger in its other limiting position.

When the valve plunger 29 reaches the position shown in Fig. 2, the restriction to flow between chambers 14 and 13 will be a maximum because the longitudinal groove 41 extends across the full width of seat land 18, and the restriction to flow between chambers 14 and 15 will be a minimum because of the free communication through the plunger groove 36. Therefore, the pressure established in annular chamber 14 will be a maximum when valve plunger 29 is in this position. Further movement of the valve plunger 29 toward the limiting position of Fig. 3 will have no effect on the pressure in chamber 14. The provision of this overtravel is useful when two of these valve plungers are arranged for sequential operation; the first moving from the Fig. 2 position to the Fig. 3 position as the second moves from the Fig. 1 position to the Fig. 2 position.

When the plunger is moved in the opposite direction, the restriction to flow to and from annular chamber 14 will be progressively increased and decreased respectively, so that the pressure in this chamber will gradually decrease. When the plunger has again reached the Fig. 1 position, annular chamber 14 will be vented.

As the plunger 29 moves between its limiting positions, every part of longitudinal groove 41 is at one time or another within either annular chamber 13 or annular chamber 14. Thus if the groove becomes clogged by foreign particles in the hydraulic oil, it will be flushed when the plunger is shifted and the clogged portion comes within one of the annular chambers.

It should be observed that since between the positions of Figs. 1 and 2 both the pressure established in annular chamber 14 and the force exerted on valve plunger 29 by spring 42 depends on the distance the plunger 29 is shifted from the Fig. 1 position, the valve affords the operator an indication of the magnitude of the force exerted by the controlled motor. This characteristic is frequently called "feel."

While in the preferred embodiment the longitudinal groove 41 is formed in the valve land 32, it will be obvious that it could perform its intended function equally as well if it were formed in the seat lands 18 and 19. In either case a plurality of grooves could be used. Furthermore, it should be apparent that the invention would be useful in valves other than those of the plunger type illustrated here. In view of this and the fact that other changes can be made in this embodiment without departing from the inventive concept, the scope of the invention should be measured solely by the following claims.

What is claimed is:

1. A valve comprising a housing having an inlet chamber, an exhaust chamber and a controlled pressure chamber; seat lands, one separating the inlet and the controlled pressure chambers and another separating the exhaust and the controlled pressure chambers; a movable valve member having a valve land, said valve member being movable between a position in which the valve land and one of the seat lands cooperate to interrupt flow from the inlet chamber to the controlled pressure chamber, and another position in which the valve land and the other seat land cooperate to interrupt flow from the controlled pressure chamber to the exhaust chamber; and means, including portions of the two seat lands and the valve land, defining a restricted passage between the controlled pressure chamber and the inlet chamber and another restricted passage between the controlled pressure chamber and the exhaust chamber when the valve member is in an intermediate position, the lengths of the two restricted passages being varied in relatively reverse senses as the valve member is moved in opposite directions from said intermediate position.

2. The valve defined in claim 1 in which each restricted passage has a constant cross-sectional area.

3. A valve comprising a housing having a cylindrical bore; inlet, exhaust and controlled pressure chambers spaced along and intersecting said bore, the chambers and the bore defining a cylindrical seat land separating the inlet chamber and the controlled pressure chamber and another similar land separating the exhaust chamber and the controlled pressure chamber; a valve plunger reciprocable in said bore and having two longitudinally spaced portions of reduced size defining a valve land, the valve plunger being movable between a first position in which the valve land has overtravelled one of the seat lands and thus blocked flow between the controlled pressure chamber and the inlet chamber, and a second position in which the valve land has overtravelled the other seat land and thus blocked flow between the controlled pressure chamber and the exhaust chamber; and at least one groove formed in the surface of the valve land and extending between the two reduced size portions, the groove and the seat lands defining a restricted flow passage between the inlet chamber and the controlled pressure chamber and another such passage between the controlled pressure chamber and the exhaust chamber when the valve plunger is in an intermediate position, the lengths of these restricted passages being varied in relatively reverse senses as the valve plunger is moved in opposite directions from said intermediate position.

4. The valve defined in claim 3 in which the groove formed in the surface of the valve land has a constant cross-sectional area.

5. The valve defined in claim 3 in which the valve land permits free communication between the controlled pressure chamber and the exhaust chamber when the valve plunger is in said first position, and permits free communication between the controlled pressure chamber and the inlet chamber when the valve plunger is in said second position.

References Cited in the file of this patent

UNITED STATES PATENTS

| | | |
|---|---|---|
| 2,327,210 | Overbeke et al. | Aug. 17, 1943 |
| 2,465,758 | Sedgwick et al. | Mar. 29, 1949 |
| 2,476,763 | Pettibone | July 19, 1949 |
| 2,480,403 | Ferris | Aug. 30, 1949 |
| 2,480,527 | Wachter | Aug. 30, 1949 |
| 2,516,449 | Coates | July 25, 1950 |
| 2,624,321 | Levetus | Jan. 6, 1953 |